United States Patent [19]
Sinko

[11] 3,909,885
[45] Oct. 7, 1975

[54] CONDUIT GARTER SPACER

[75] Inventor: George M. Sinko, Royal Oak, Mich.

[73] Assignee: Underground Products, Inc., Livonia, Mich.

[22] Filed: May 28, 1974

[21] Appl. No.: 473,375

[52] U.S. Cl. .............................. 24/16 PB; 138/113
[51] Int. Cl.² ..................... B65D 63/00; F16L 9/18
[58] Field of Search .......... 138/106, 110, 112, 113; 24/16 PB, 17 AP, 73 PB, 20 CW

[56] References Cited
UNITED STATES PATENTS

| 360,782 | 4/1887 | Ober | 138/113 |
|---|---|---|---|
| 1,173,998 | 2/1916 | Depew | 24/20 CW |
| 3,126,918 | 3/1964 | Eaton | 138/113 |
| 3,237,796 | 3/1966 | Callahan | 138/110 |
| 3,374,308 | 3/1968 | Haas | 138/113 |
| 3,540,487 | 11/1970 | LoRusso | 138/112 |
| 3,581,347 | 6/1971 | Verspieren | 24/16 PB |

FOREIGN PATENTS OR APPLICATIONS

| 898,124 | 6/1962 | United Kingdom | 24/73 PB |
| 376,328 | 5/1964 | Switzerland | 138/113 |

Primary Examiner—Donald A. Griffin
Attorney, Agent, or Firm—Hauke, Patalidis & Dumont

[57] ABSTRACT

A conduit garter spacer for disposing around the periphery of conduits, pipes, or ducts, at appropriate intervals along the length of each conduit, and providing separation between the individual conduits when nestled in a bundle for burying underground or encasing in a bed of concrete or cement. The spacer of the invention is in the form of a web of preferably resilient material, such as plastic, molded with a plurality of regularly disposed folds such as to form a generally annular spacer when disposed about the periphery of the conduit. Means are provided on an end of the web for connecting the two ends together and for permitting a garter spacer of a given length to be used with conduits of diverse diameters within a given range.

6 Claims, 6 Drawing Figures

U.S. Patent Oct. 7, 1975 3,909,885
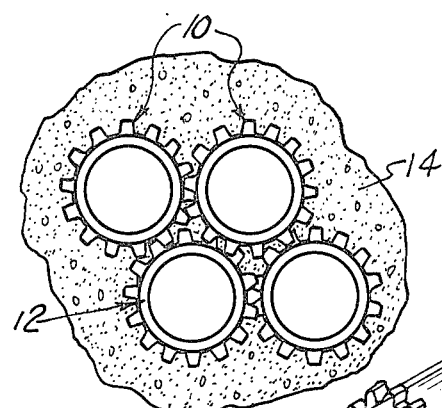
FIG. 1
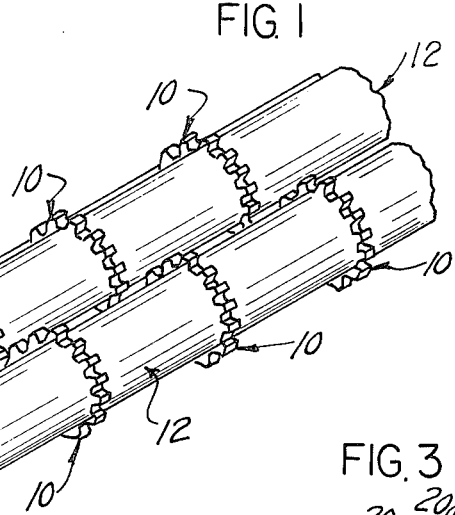
FIG. 2
FIG. 3
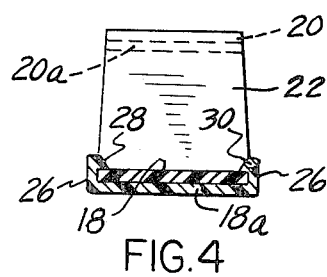
FIG. 4
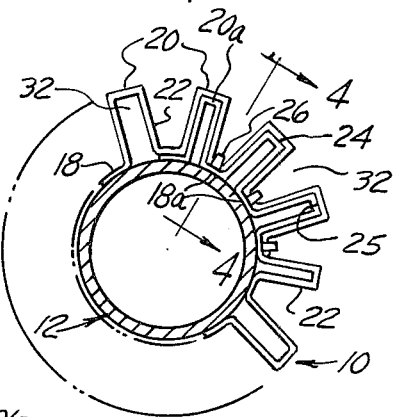
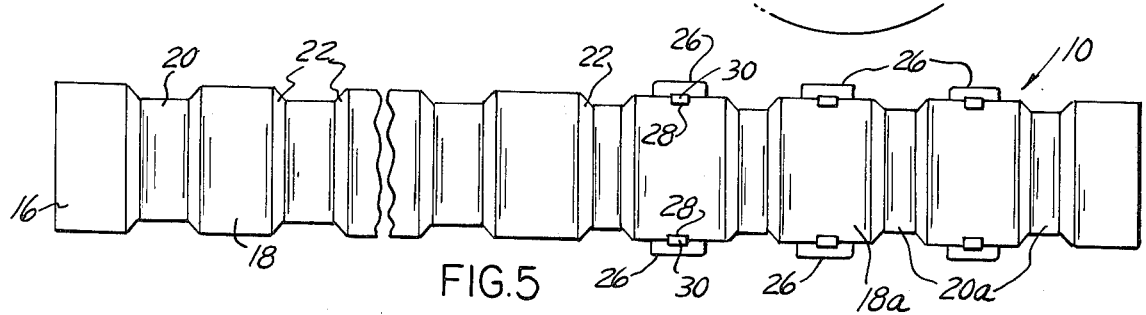
FIG. 5
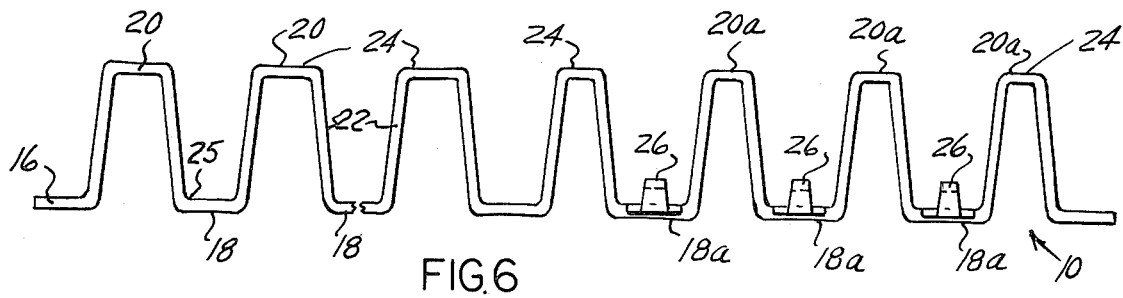
FIG. 6

CONDUIT GARTER SPACER

BACKGROUND OF THE INVENTION

The invention relates to a garter spacer for conduits, pipes or ducts which are nestled in a bundle in a parallel spaced relationship prior to burying the bundle in the ground or encasing in concrete.

Electric power lines and telephone lines are commonly placed in conduits, pipes or ducts buried underground, after being laid in a trench filled with an appropriate filling material. Generally, earth or sand is dumped, or concrete is poured, into the trench so as to solidly encase the conduits, pipes or ducts, for providing an appropriate ground level support capable of carrying an important load, especially when the conduits, pipes or ducts are buried under a pavement. For underground crossings of railways and highways, the conduits, pipes or ducts are preferably housed in a steel casing, and the voids in the steel casing are filled with sand, solid concrete or cellular concrete. Whether the bundle of conduits is placed directly in a trench or whether it is disposed in a casing, it is desirable to maintain the conduits in parallel spaced relationship, a predetermined distance from each other, by means of spacers such that the voids between the conduits are filled with the filling material used for filling the trench or the casing. In this manner, the conduits are solidly supported by the filling material about their peripheral surface, thus avoiding direct line contacts between the conduits in the bundle which result in deformation and distortion of the conduits, and even breakage caused by too high a pressure applied to too small an area of contact between contiguous conduits.

Plastic or metallic doughnut-shaped spacers are often used for maintaining conduits in an appropriate spaced relationship in a bundle, but such an arrangement when the spacers are made in the form of a solid annular member presents the inconvenience of preventing filling material from following or being injected in the voids between adjacent conduits beyond the dam created by the presence of the spacer. In addition, doughnut-shaped spacers, even when provided with appropriate apertures permitting the passage of filling material therethrough, must be made in different sizes for accommodating pipes, conduits or ducts of diverse sizes.

The disadvantages and inconveniences of conduit spacers of the prior art are overcome by the conduit garter spacer structure of the present invention which, once placed about the periphery of a conduit at appropriate distance along the length of the conduit, provides sturdy mutual support and adequate spacing for a plurality of conduits in a bundle, and allows a free flow of the filling material through the spacers, such that all the voids and spaces between the several conduits in the bundle are filled by the filling material after the bundle is disposed in a trench or a casing.

SUMMARY OF THE INVENTION

The present invention provides a one-piece conduit garter spacer which is simple, inexpensive and adjustable in size and capable of maintaining diverse conduits, pipes or ducts in a bundle in an appropriate spacial relationship. Although presenting all the advantages of prior art garter spacers such as of the doughnut-type, the present invention presents the further advantages of being adjustable to diverse conduit sizes within a given range, and of having a relatively large area through its annular space affording an unimpeded path to the flow of filling material.

The several objects and advantages of the present invention will become apparent to those skilled in the art when the following description of the best mode contemplated for practicing the invention is read in conjunction with the accompanying drawing.

BRIEF DESCRIPTION OF THE DRAWING

In the accompanying drawing, wherein like reference numbers relate to like or equivalent parts:

FIG. 1 is a perspective schematic view of conduits in a bundle showing the manner in which the garter spacer of the invention is used for maintaining the several conduits in parallel spaced relationship;

FIG. 2 is an end view of a plurality of conduits provided with the garter spacer of the invention, imbedded in a space filling material;

FIG. 3 is an elevation view of a garter spacer according to the invention disposed about the periphery of a cylindrical conduit;

FIG. 4 is a sectional view, at an enlarged scale, from line 4—4 of FIG. 3;

FIG. 5 is a top plan view of the garter spacer of the invention as supplied to the user; and FIG. 6 is a side elevation view thereof.

DETAILED DESCRIPTION OF THE PREFERRED EMBODIMENT

Referring to the drawing and more particularly to FIGS. 1 and 2 thereof, the garter spacer 10 of the invention is disposed at appropriate intervals about the periphery of each individual conduit 12 in a bundle prior to placing the bundle in a trench or in a casing. The plurality of conduits 12 forming a bundle are generally held together by means of appropriate straps, not shown, generally made of plastic, or, alternatively, the conduits may be individually placed in the trench such as to form a bundle in situ. The conduits 12 may be metallic conduits but they are generally made of plastic, asbestos, cement or fibre material. Through the interior of the conduits are run electrical or telephone cables, for example, and the bundle of conduits is laid in a trench which is subsequently filled with an appropriate filling material or they are laid or pushed through a casing, which is in turn filled with an appropriate filling material such as sand or concrete. Any required number of conduits may be placed in a bundle and the spacers 10 are slipped or wrapped about the periphery of each individual conduit prior to nestling the bundles, for example, at a distance approximately four to five feet apart. The garter spacer 10 is dimensioned so as to provide a predetermined separation between contiguous conduits chosen in any dimension in a range such as, for example, from ½ inch to 3 inch. The location of the spacers on on conduit is arranged such as not to interfere with the spacers disposed about an adjoining conduit, and the spaces and voids between conduits are filled with a filling material 14, FIG. 2, such as earth, sand or concrete. The structure of the garter spacers 10 of the invention permits to support the conduits 12 in their appropriate spacial relationship and allows the filling material 14 to flow more evenly around each individual conduit in the bundle. These results are achieved by the particular open structure of the invention hereinafter described in detail, which, although affording a sturdy support to the conduits, provides a free passage to the filling material through the open spaces of the spacer structure.

As shown at FIG. 3, illustrating the garter spacer 10 disposed about the periphery of a conduit 12, and at FIGS. 5 and 6 showing the garter spacer as it is provided to the user, the garter spacer 10 is in the form of a relatively thin web of material molded with a plurality of appropriate repands or folds such that when fastened about the periphery of the conduit 12, inner segments 18 of the web 16 are engaged with the peripheral surface of the conduit 12, and outer segments 20 define an imaginary surface adapted to engage the peripheral surface of adjoining conduits. The inner segments 18 are integrally connected to the outer segments 20 by way of generally radially disposed spoke-like segments 22 and the segments 18, 22 and 20, respectively, are normally approximately at right angles to each other. The web 16 is made of a relatively flexible material, preferably plastic, and presents in profile a zigzag appearance having some analogy with an embattlement wall formed of a succession of merlon-like projections 24 and crenel-like indentations 25 occurring at a substantially constant period.

A few outer segments 20, proximate an end of the garter spacer, are provided with a reduced length, as shown at 20a, and the inner segments 18 have a correspondingly increased length, as shown at 18a, to permit the ends of the spacer to be attached one to the other, as shown at FIG. 3, by introducing at least one of the merlon-like projections 24 provided with the reduced length outer segment 20a into the crenel-like indentation 25 corresponding to an increased length inner segment 18a. Each of the increased length inner segments 18a is provided with a pair of brackets 26 extending upwardly substantially at a right angle to the surface of the segment, each bracket 26 being provided with an inwardly extending lip portion 28.

As best shown at FIG. 4, the lip portion 28 of each bracket 26 has a slanted leading surface 30 which permits the brackets 26 in a pair to spread apart when the inner segment 18 at the other end of the web 16 is pressed toward the surface of an increased length inner segment 18a until the brackets 26 snap back into position, thus holding securely one end of the web attached to the other end. By providing the above described interlocking means consisting of a widened crenel-like indentation 25 with an appropriate pair of attaching brackets 26 on several consecutive inner segments 18a of increased length at one end of the garter spacer, a garter spacer of a given length is capable of accommodating conduits of different sizes within a range. In addition, the web 16 is made of a substantially flexible resilient material, such as plastic, which permits the garter spacer 10 to resiliently accommodate small variations in conduit peripheral shape and dimension within a given size.

The garter spacer 10 is preferably molded in the sinuous form illustrated, and to facilitate unmolding an appropriate draft is provided in the mold cavity, with the result that the integral inner segments 18 are slightly wider transversely than the outer segments 20, and that the radial segments 22 are provided with a slight taper from the inner to the outer segments as best shown in FIG. 4. Alternately, the garter spacer of the invention may be made of an extruded web of material folded in shape by means of a heated die, and provided with the brackets 26 in a subsequent operation.

Although the conduit garter spacer 10 of the invention is illustrated at FIG. 3 with the web inner segments 18 disposed in engagement with the peripheral surface of the conduit 12, it will be appreciated that because of the flexibility of the material used for making the spacer web, the spacer may be wrapped around the conduit in such manner that the segments 20, rather than the segments 18, are engaged with the peripheral surface of the conduit, and the spacer of the invention may also be used with conduits or pipes of a sectional shape other than a circular shape.

When disposed around a conduit, the garter spacer 10 of the invention forms an annular spacer provided with a plurality of open spaces, as shown at 32 at FIG. 3, which offer very little obstacle to the free flow of filling material along the length of the conduits even when disposed in a tied bundle. Once all the voids and spaces between the several conduits in a bundle are filled with the filling material and the spaces 32 are also filled with that filling material, a consistent and sturdy load support is afforded to the bundle of conduits embedded in the filling material.

Having thus disclosed the invention by way of a typical embodiment thereof, modifications thereof will be obvious to those skilled in the art, what is claimed as novel is as follows:

1. A conduit garter spacer comprising a web of material formed with a plurality of zigzag folds defining a pair of substantially parallel imaginary surfaces, each of said surfaces being defined by the loci of the vertices of said folds, wherein said zigzag folds are substantially at right angles, and successive folds form in side elevation a sinuous design of consecutive merlon-like projections and crenel-like indentations of substantially constant period, and means at an end of said web for resiliently gripping the edges of the other end of said web, with at least one merlon-like portion at said other end projecting within a crenel-like portion at said first end.

2. The conduit garter spacer of claim 1 further comprising means disposed at at least an end of said web for attachment to the other end of said web, with said web disposed about the periphery of a conduit.

3. The conduit garter spacer of claim 1 wherein said material is a plastic material.

4. The conduit garter spacer of claim 1 wherein said means comprises at least a pair of symmetrically disposed brackets projecting from opposite edges of said web toward the open end of a crenel-like indentation, each of said brackets having an integral inwardly projecting lip for resiliently grabbing the edges of said web at a merlon-like projection when disposed within said crenel-like indentation.

5. A conduit garter spacer for wrapping about the periphery of a conduit, said spacer comprising a continuous web of substantially thin and flexible material bent in a series of regular substantially right angle folds forming consecutive indentations and projections, a first group of alternate integral segments of said web normally engaging the peripheral surface of said conduit, a second group of alternate integral segments of said web being normally disposed substantially parallel to said peripheral surface of said conduit, a third group of segments of said web being normally radially disposed and integrally connecting the end of a segment in said first group to the end of a segment in said second group, and means integral with said web proximate an end thereof for attaching said end with the other end of said web when said garter spacer is wrapped about the periphery of said conduit, said means comprising a pair of symmetrically disposed integral brackets projecting from opposite edges of said web at right angle to said web, each of said brackets having a lip portion disposed for engaging the edges of said web proximate the other end thereof with at least a projection at said other end engaged into an indentation at said end provided with said brackets.

6. The conduit garter spacer of claim 5 wherein said first end of said web has a plurality of said projections having a reduced width for meshing into said indentation at the other end of said web, consecutive ones of said projections of reduced width defining therebetween consecutive indentations of correspondingly increased width, a plurality of which are provided with said brackets.

* * * * *